UNITED STATES PATENT OFFICE.

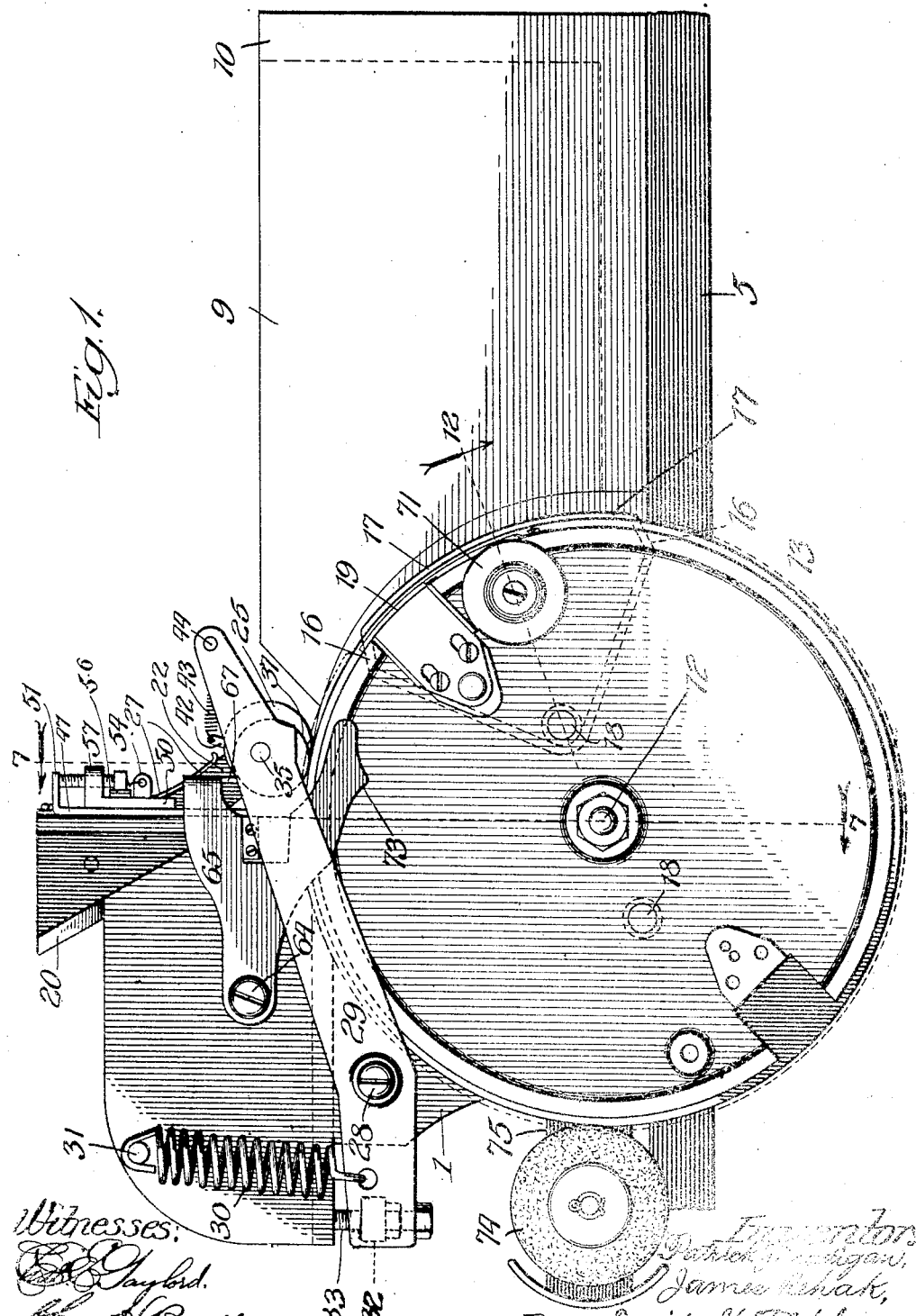

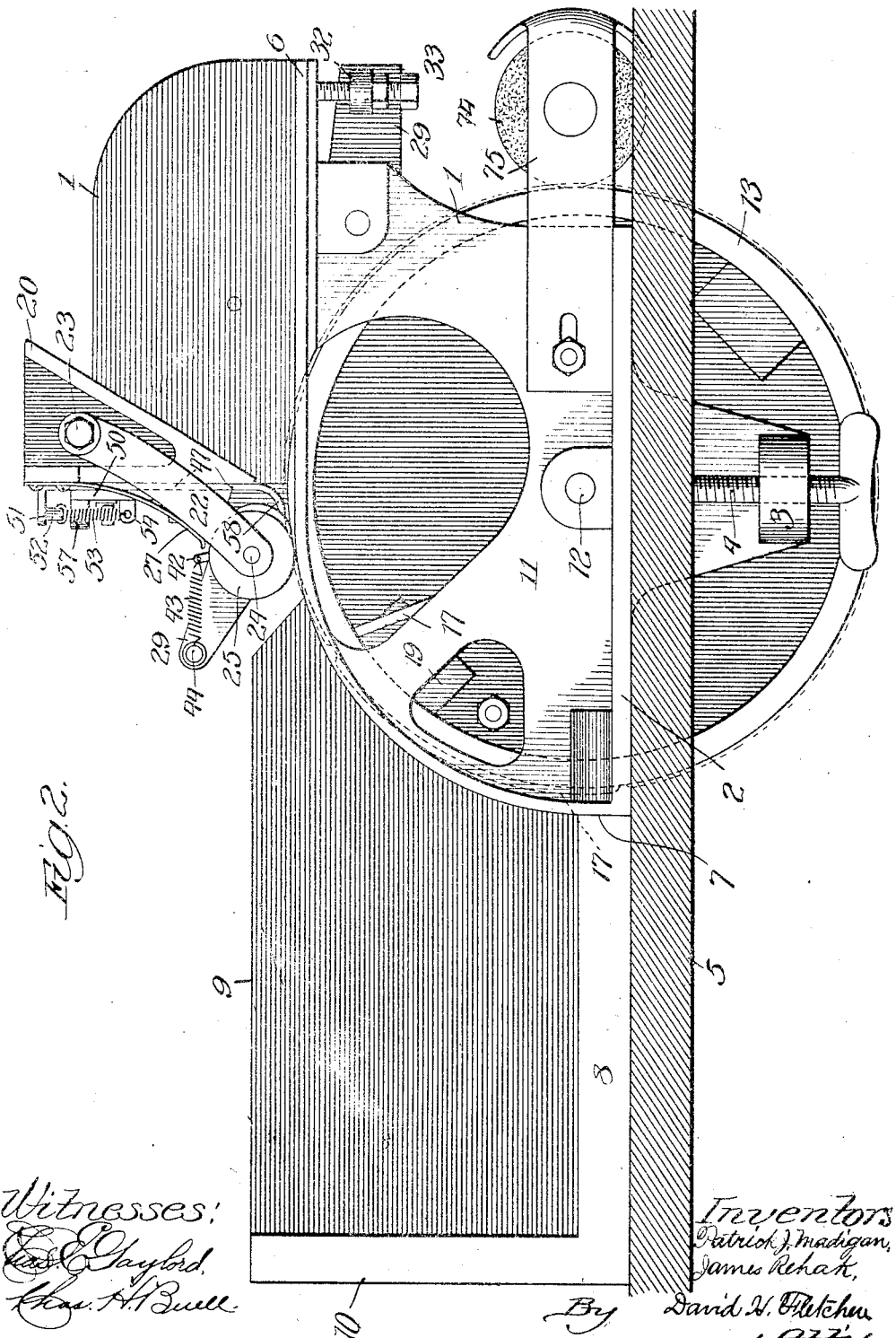

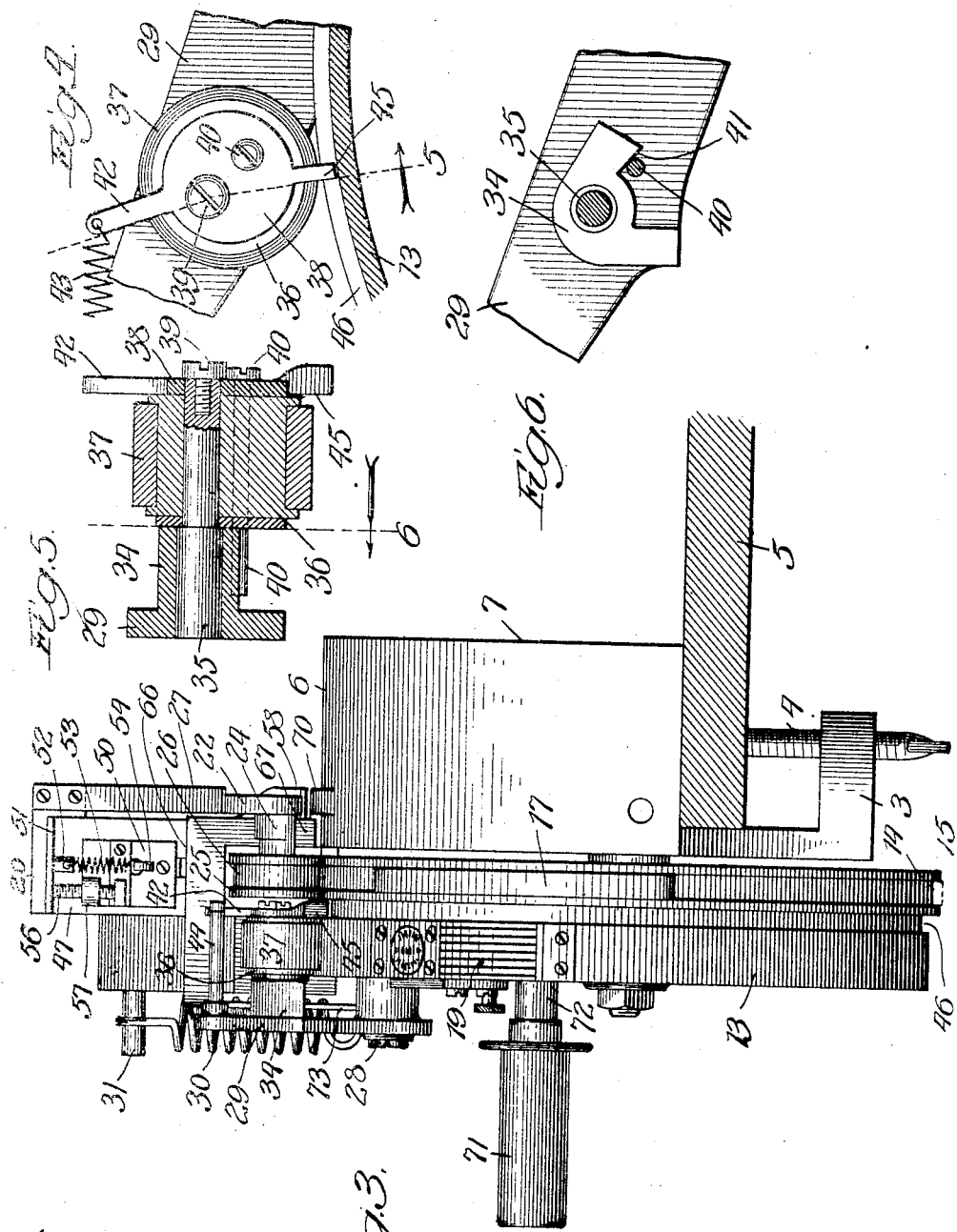

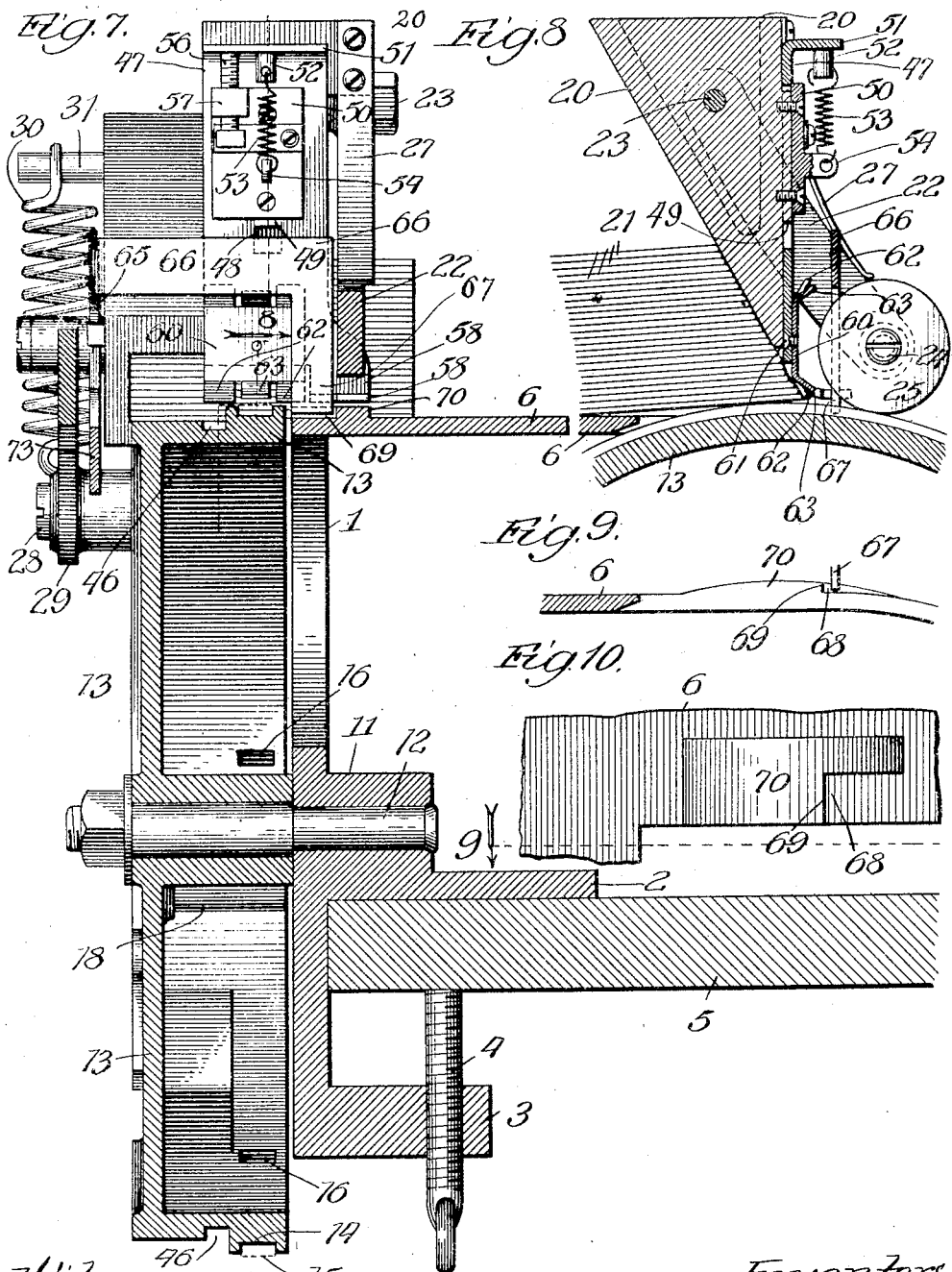

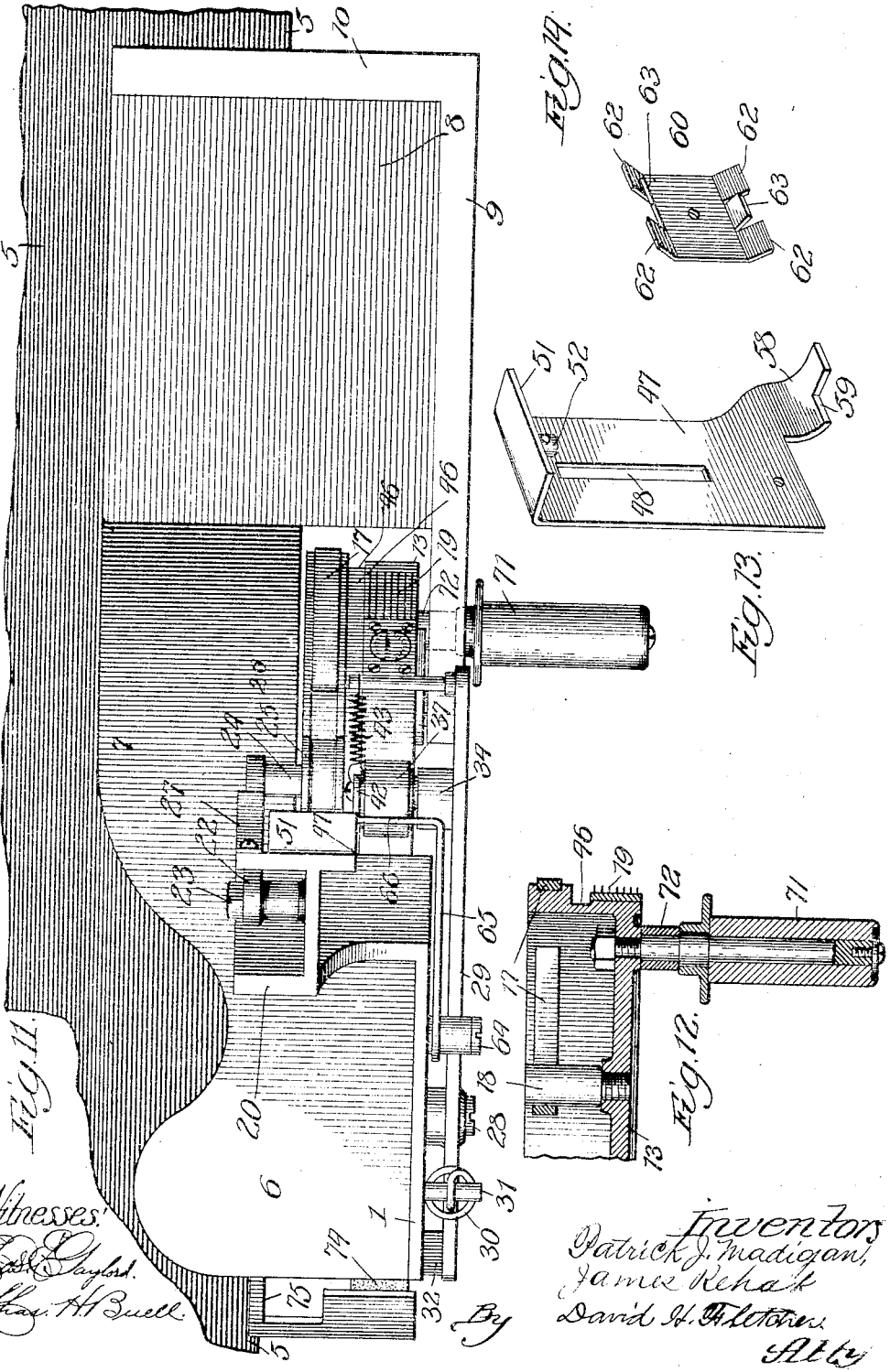

PATRICK J. MADIGAN AND JAMES REHAK, OF CHICAGO, ILLINOIS.

POSTMARKING-MACHINE.

1,039,560.

Specification of Letters Patent. Patented Sept. 24, 1912.

Application filed June 5, 1911. Serial No. 631,408.

*To all whom it may concern:*

Be it known that we, PATRICK J. MADIGAN and JAMES REHAK, citizens of the United States, residing at Chicago, in the county of Cook and State of Illinois, have invented certain new and useful Improvements in Postmarking-Machines, of which the following is a description, reference being had to the accompanying drawings, forming a part of this specification, in which corresponding numerals of reference in the different figures indicate like parts.

The object of our invention is to provide a simple, cheap, compact and effective postmarking and canceling machine preferably adapted to be operated by hand and so constructed as to cause proper registration between the mail-piece and marking die and such coaction between the die and the impression roller that a satisfactory impression may be made upon each mail-piece while preventing the impression roller from being brought into contact with the die when no mail-piece is passing.

To these and other subsidiary ends, our invention consists in the combination of elements hereinafter more particularly described and definitely pointed out in the claims.

In the drawings: Figure 1, is a side elevation of a machine embodying the features of our invention, said machine being supported upon a table which is broken away. Fig. 2, is a like view thereof shown from the opposite side, the table being represented in longitudinal section, Fig. 3, is a front elevation of said machine, the supporting table being shown in transverse section. Fig. 4, is an enlarged view in detail of the impression roller, a portion of the supporting arm upon which said roller is mounted and a part of the die roller in longitudinal vertical section. Fig. 5, is a sectional view thereof, taken upon the line 5—, Fig. 4, viewed in the direction of the arrow there shown, Fig. 6, is a sectional view taken upon the line 6—, Fig. 5, viewed in the direction of the arrow there shown, Fig. 7, is a transverse sectional view taken upon the line 7—7, Fig. 8, viewed in the direction of the arrows there shown, Fig. 8, is a sectional view taken upon the line 8—, Fig. 7, viewed in the direction of the arrow there shown, Fig. 9, is a longitudinal sectional view of a portion of the frame-plate and timing stop, said view being taken upon the line 9—, Fig. 10, viewed in the direction indicated by the arrow there shown, Fig. 10, is a plan view of a portion of said plate, Fig. 11, is a plan view of the machine with a portion of the supporting table, Fig. 12, is a sectional view in plan taken upon the line 12—, Fig. 1. Fig. 13, is a perspective view of a portion of one of the plates of the separating mechanism, and Fig. 14, is a like view of a supplemental plate arranged to coact therewith.

Referring to the drawings, 1 represents generally a main vertical frame-plate, better shown in Figs. 1, 2 and 7, having a horizontal flange or base-plate 2, a depending bracket 3 and clamping screw 4, by means of which it may be secured to a table or other support 5. A horizontal feed-plate 6, is extended laterally from the vertical plate 1 and forwardly to a predetermined point from whence it is curved downwardly to unite with the plate 2 as shown at 7, thereby forming a partial housing for the die wheel as hereinafter described. Extending forward from the part 7 is an open box-like receptacle comprising a bottom 8, a side wall 9 and a front wall 10, for receiving the canceled mail-pieces.

A boss 11 is formed upon the plate 2, to which is secured a horizontal wrist-pin 12, which forms a bearing for a combined feed and die-wheel 13. Said wheel is preferably cast in the form of a hollow cylinder and its width is such that one-half may be used for the marking die and the other for feeding the mail-pieces. The feeding portion is of somewhat larger diameter than that to which the die is secured and has formed therein a continuous peripheral groove 14, in a part of which is inserted a feeding element while the remainder may either be left open or may be provided with a filling 15, of leather or other frictional material preferably arranged to project slightly beyond the adjacent vertical surfaces, as indicated in dotted lines.

Formed in the rim of the feed portion of the wheel within the groove 14, are openings 16, shown in full lines in Fig. 7 and in dotted lines in Fig. 1, through which is passed a belt 17, of india rubber or other suitable frictional material, said belt being arranged to lie partially within the groove 14, but being of sufficient thickness to extend beyond the periphery of the wheel as clearly shown in Fig. 1, the remaining portion of the groove being left open, or if preferred, filled with the leather or other filling material 15 as stated. The belt 17 is passed around a stud 18, secured to the web of the wheel as shown in Fig. 12 and indicated in dotted lines in Fig. 1. This construction enables the belt to be shifted from time to time as it becomes worn, so as to present a new wearing surface upon the periphery of the wheel. A marking and canceling die 19, is arranged to project slightly beyond the periphery of the die portion of the wheel, being located opposite to the feed-surface 17.

Formed upon the vertical portion 1 of the frame is a laterally extended frame portion 20, which is located above the wheel, the rear part of which is forwardly and downwardly inclined as shown in Figs. 2 and 8, to form an abutment for mail-pieces 21, as indicated in the latter figure. An arm 22, is pivotally supported upon a stud 23, to the lower end of which arm is secured a wrist-pin 24, upon which is mounted a feed roller 25, having a peripheral groove 26 therein, Figs. 3 and 11, adapted to receive the projecting portion of the feed belt or member 17, when the main wheel is rotated. A spring 27, acting upon the pivoted arm, serves to press the feed roller 25 against the periphery of the feed portion of the main wheel 13.

Pivoted at 28 upon a stud attached to the vertical frame-plate is a lever 29, the rear end of which is connected with the frame by means of a coiled spring 30, attached to a stud 31. A laterally projecting arm 32, is formed upon the inner face of said lever and arranged to project beneath the frame plate 6, said arm being provided with a set-screw 33, Figs. 1 and 2, to form an adjustable stop for said lever. Formed upon the inner face of said lever is a boss 34, Figs. 3, 5, 6 and 11, having a wrist-pin 35, extending inwardly therefrom which forms a pivotal bearing for an eccentric 36. Said eccentric in turn forms a bearing for a loose ring or roller 37, which serves as an impression roller. A plate 38, is attached to said eccentric by means of screws 39, 40, the former of which is extended into the end of the stud 35 and the latter through the eccentric 36, as shown in Fig. 5, into position to contact with a stop 41 formed by an extension of the boss 34, to limit the backward movement of the eccentric as hereinafter stated. An arm 42 is extended upwardly from the plate 38 and is connected by means of a coiled spring 43, to a stud 44, upon the end of the lever 29. Said arm and spring serve to hold the eccentric in a normal position with the screw or pin 40 against the stop 41. When the eccentric is in its normal position as shown in Fig. 4, the impression roller 37 thereon should be out of contact with the periphery of the wheel 13. This may be accomplished by means of the set screw 33, Fig. 1. A trip finger 45, is extended downwardly from the plate 38, so as to project normally into a groove 46, formed in the periphery of the main wheel 13 and which forms a dividing space between the feed and die portions of the wheel. A sheet-metal separating plate 47, Figs. 1, 2, 3, 7, 8, 11 and 13, is provided with a vertical slot 48 through which is projected a guiding element 49, Figs. 7 and 8 formed upon the front face of the part 20. A retaining plate 50, attached to the part 49, serves to retain said separating plate in place while permitting it to move vertically. A flange 51 is extended outwardly from the plate 47. A stud 52 thereon is connected by means of a coiled spring 53, with a lug 54, upon the stationary plate 50. The tendency of the spring is to pull downwardly upon the plate for the purpose of holding it in a predetermined position with respect to the mail-pieces 21. A set-screw 56, tapped into a boss 57 upon the plate 50, enables the position of the separating plate to be accurately adjusted. The plate 47 is provided with a downwardly and forwardly bent portion 58, having a notch or cut-away portion 59, Fig. 13, to provide for the movement of a timing-stop as hereinafter described. A movable supplemental plate 60, shown in detail in Fig. 14, is attached by means of a screw 61, Fig. 8, to the lower portion of the plate 47. Said plate 60 is provided with two fingers 62, at top and bottom, bent at corresponding angles as shown to the plane of the plate and a middle finger 63 bent at a different angle as shown. The fingers 62 are adapted to stand close to the periphery of the feed portion of the wheel while the finger 63 is raised somewhat to permit the passage beneath it of the feed-belt 17. The object in having the fingers at top and bottom is to enable the plate to be reversed when the fingers become worn.

It is desirable to employ a timing stop in conjunction with the machine which will now be described. Pivoted at 64, Figs. 1 and 11, upon the side of the frame-plate 1, is an arm 65, provided with a laterally bent portion 66, which is extended over the feed wheel and is provided upon its end with a depending finger 67, adapted when in its lowermost or normal position to enter a depression 68 in front of a shoulder 69, in advance of a raised portion 70 formed upon the feed plate. The wheel 13, is provided with a handle 71, upon which is journaled a friction roller 72, see Fig. 12, adapted, when the wheel is rotated, to engage a cam-shaped arm 73, better shown in Fig. 1, upon the arm 65, and lift the timing stop 67 in harmony with the movement of the die. An inking roller 74 is mounted upon a rearwardly extended arm 75, in operative proximity to the marking die.

The operation of said machine is as follows: The mail-pieces 21 are placed upon the feed-plate 6 with their forward ends abutting against the inclined wall 20, as shown in Fig. 8, and pressed downwardly by the hand of the operator. The crank 74 is then turned, which causes the friction surface 15 to act upon the face of the lowermost mail-piece to advance it in the direction of movement of the periphery of the main feed-wheel. This action causes the end of said piece to be brought into contact with the obliquely disposed fingers 62 of the separating plate, which is lifted thereby against the action of the spring 53, to permit said piece to pass while the other pieces are held back. The lowermost piece is thus advanced until its end contacts with the timing finger 67, by which it is arrested and held until said finger is lifted by the action of the roller 72 upon the cam arm 73. The mail-piece, being thus released, is advanced until the end passes beneath the pressure or feed roller 25. By the time it is in engagement with the latter it is also brought into contact with the trip-finger 45, which is pushed forward thereby against the action of the spring 43. This action causes the eccentric 36 to be rotated upon its axis thereby advancing the lower portion forwardly and downwardly until the periphery of the roller is wedged against the mail-piece, thereby pressing the latter against the die 19. The feed surface or belt 17, being located adjacent to the die, the action of the two is simultaneous and, hence a more positive feeding action is exerted upon the mail-piece at the time when the greatest resistance occurs. When a mail-piece is marked it is moved forwardly and falls into the receptacle at the front. When the rear end of the mail-piece passes from beneath the trip-finger 45, the impression roller is restored to its normal position out of contact with the die-wheel. In the construction as represented in Fig. 1, we have shown but one die and one feed belt 17, but provision is made as shown for attaching a secondary die and feed belt opposite to those described, as well as for a friction roller for actuating the timing stop. Such a construction would enable two mail-pieces to be marked with each revolution of the main wheel. We prefer, however, when the machine is driven by hand to use but a single die.

Having thus described our invention, what we claim and desire to secure by Letters-Patent is:—

1. In a post-marking machine, the combination with a wheel mounted upon a horizontal axis, said wheel having a marking die upon its periphery and a projecting frictional feeding surface adjacent thereto, of a spring-pressed roller arranged to contact with said feeding surface, means for supporting said mail-pieces flatwise with the forward end of the lowermost piece in contact with said feeding surface, separating mechanism, a timing stop in advance of said separating mechanism, means upon said wheel for removing said stop at a predetermined interval, an eccentric mounted upon a horizontal axis above the portion of said wheel upon which said die is located, an impression roller mounted upon said eccentric, yielding means for rearwardly tilting said eccentric and a trip-finger connected with said eccentric and arranged to extend into the mail-piece path.

2. In a post-marking machine, the combination with a wheel mounted upon a horizontal axis, said wheel having a marking die upon its periphery and a projecting frictional feeding surface adjacent thereto separated therefrom by a longitudinal groove, of a spring-pressed roller arranged in the plane of the feeding portion of said wheel, means for supporting mail-pieces above said wheel with the lowermost piece in contact with the frictional surface of its periphery, an eccentric mounted upon a horizontal axis above the die portion of said wheel, yielding means for normally holding said eccentric with its high point in the rear of its axis, a finger rigidly attached to said eccentric with its free end projecting into said longitudinal groove and an impression roller mounted upon said eccentric.

3. In a post-marking machine, the combination with a wheel having a horizontal axis, said wheel being divided in a plane transverse to its axis into feeding and marking portions respectively one having a frictional feeding surface, and the other a die, a spring-pressed roller arranged to bear against said feeding portion, means for supporting mail-pieces to be fed to the upper surface of said wheel, a vertically movable spring-pressed separator bent forwardly at its lower end at an angle to its plane of movement, a timing stop held normally in the mail-piece path in advance of said separator, a pivoted spring-pressed arm arranged adjacent to said die wheel, an eccentric pivotally mounted upon said arm above said wheel, means for yieldingly holding the same with its high point of eccentricity in the rear of its axis, an impression roller mounted on said eccentric and a trip-finger attached to said eccentric and extending downwardly into the mail-piece path.

4. In a post-marking machine, the combination with a wheel arranged to rotate in a vertical plane, said wheel being divided in the plane of its rotation into adjacent feeding and marking portions, one having a frictional feeding surface and the other a die, of a spring-pressed roller arranged to bear against the former, an impression roller arranged to co-act with said die portion, means for normally holding the same out of contact therewith, a trip-finger in position to be actuated by a mail-piece for bringing said impression roller into contact with a mail-piece to press it against the die, a gravity timing stop preceding said spring pressed roller and means actuated by said wheel for lifting said stop to release a mail-piece when the die is presented opposite to the impression roller.

In testimony whereof, we have signed this specification in the presence of two subscribing witnesses, this third day of June 1911.

PATRICK J. MADIGAN.
JAMES REHAK.

Witnesses:
DAVID H. FLETCHER,
JENNIE L. FISKE.